ized and the digitized picture signal is compressed by an inversible encoding method.

United States Patent
Nagai et al.

(10) Patent No.: US 7,483,566 B2
(45) Date of Patent: Jan. 27, 2009

(54) DIGITAL PICTURE SIGNAL PROCESSING APPARATUS, METHOD THEREOF, DIGITAL PICTURE RECORDING APPARATUS, METHOD THEREOF, TRANSMITTING METHOD THEREOF, AND DATA RECORD MEDIUM THEREOF

(75) Inventors: Jun Nagai, Tokyo (JP); Mio Ozawa, Chiba (JP); Katsuhiko Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 686 days.

(21) Appl. No.: 11/153,022

(22) Filed: Jun. 14, 2005

(65) Prior Publication Data

US 2005/0231608 A1    Oct. 20, 2005

Related U.S. Application Data

(62) Division of application No. 09/772,150, filed on Jan. 29, 2001, now Pat. No. 6,961,460.

(30) Foreign Application Priority Data

Jan. 31, 2000 (JP) ............................ 2000-027361
Feb. 28, 2000 (JP) ............................ 2000-056000
Feb. 28, 2000 (JP) ............................ 2000-056001

(51) Int. Cl.
*G06K 9/00* (2006.01)
*H04N 5/228* (2006.01)
*G06K 9/34* (2006.01)

(52) U.S. Cl. ................... 382/162; 382/168; 348/222.1

(58) Field of Classification Search .............. 382/162, 382/166, 173, 176, 232, 234, 239, 244, 248, 382/282, 168; 358/426.01, 426.02, 426.13, 358/426.14, 462; 348/384.1, 390.1, 403.1, 348/404.1, 207.99, 207.1, 207.2, 222.1, 333.01
See application file for complete search history.

(56) References Cited

U.S. PATENT DOCUMENTS 4,958,301 A    9/1990    Kobayashi (Continued)

OTHER PUBLICATIONS

Haskell B. G. et al: "Image and Video Coding—Emerging Standards and Beyond" IEEE Transactions on Circuits and Systems for Video Technology, vol. 8, No. 7, Nov. 1, 1998, pp. 814-836, XP000790129 IEEE, Piscataway, NJ, US ISSN: 1051-8215.

(Continued)

*Primary Examiner*—Yon Couso
(74) *Attorney, Agent, or Firm*—Frommer Lawrence & Haug LLP; William S. Frommer

(57) ABSTRACT

A digital picture signal processing apparatus is disclosed, that comprises a picture processing means for compressing a captured digital picture signal, and a mode designating means for generating a signal that designates a picture processing operation of the picture processing means to a first mode or a second mode, wherein when the first mode is designated, the picture processing means generates first compressed picture data of which the digital picture signal is compressed by a non-inversible encoding method, and wherein when the second mode is designated, the picture processing means generates second compressed picture data of which the digital picture signal is digitized and the digitized picture signal is compressed by an inversible encoding method.

26 Claims, 15 Drawing Sheets

U.S. PATENT DOCUMENTS

| | | |
|---|---|---|
| 5,553,160 A | 9/1996 | Dawson |
| 5,668,646 A | 9/1997 | Katayama et al. |
| 5,724,508 A | 3/1998 | Harple et al. |
| 5,742,704 A | 4/1998 | Suzuki |
| 6,272,484 B1 | 8/2001 | Martin et al. |
| 6,289,118 B1 | 9/2001 | Cossey |
| 6,304,277 B1 | 10/2001 | Hoekstra et al. |
| 6,583,887 B1 | 6/2003 | Clouthier et al. |
| 7,068,328 B1 * | 6/2006 | Mino .................. 348/672 |
| 2003/0030831 A1 | 2/2003 | Murata |

OTHER PUBLICATIONS

Herley C: "Storage of Digital Camera Images" Proceedings of the 1999 International Conference on Image Processing (ICIP '99), vol. 3, Oct. 24, 1999, pp. 940-942, XP010368754 IEEE, US ISBN: 0-7803-5467-2.

Chandra S et al: "Managing the Storage and Battery Resources in an Image Capture Device (Digital Camera) using Dynamic Transcoding" Proceedings of the Third ACM International Workshop on Wireless Mobile Multimedia (WOWMOM 2000), Aug. 11, 2000, pp. 73-82, XP002351506 ACM, US.

* cited by examiner

Fig. 4A

```
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
```

Fig. 4B

```
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
ABCDEFGHIJKLMFOPQRSTUVWXYZ 0123456789
```

Fig. 4C

JPEG DIGITIZED PICTURE

JPEG DIGITIZED PICTURE

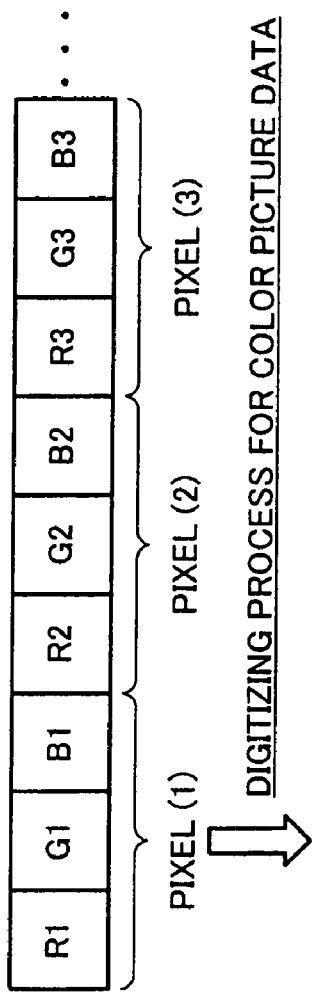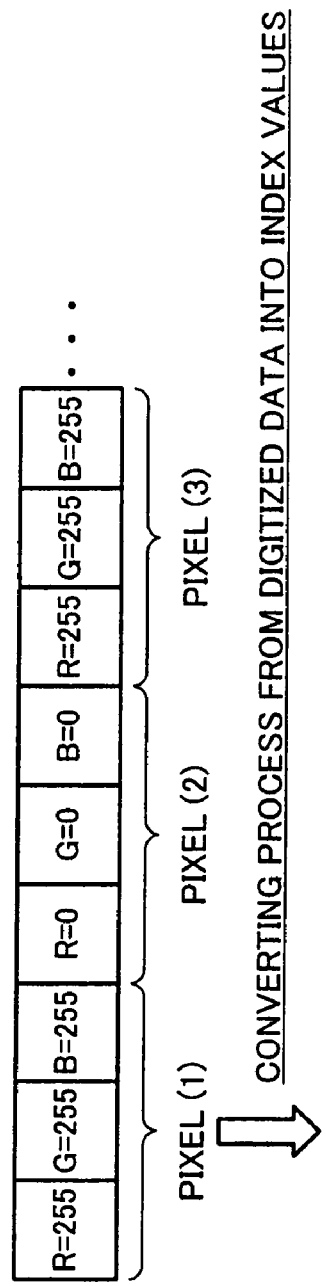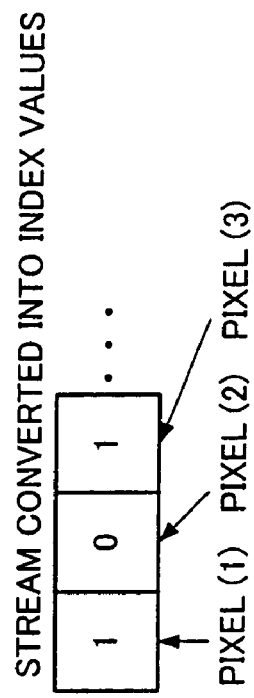
Fig. 6A
Fig. 6B
Fig. 6C

Fig. 7
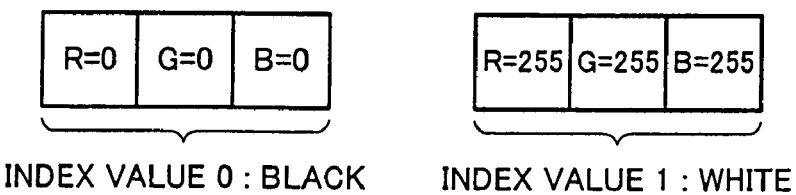
INDEX VALUE 0 : BLACK   INDEX VALUE 1 : WHITE
Fig. 8A
DATA STREAM OF DIGITIZED PICTURE
Fig. 8B
ACTUALLY COMPRESSED DATA STREAM
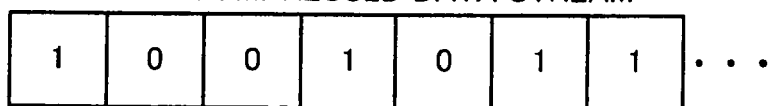
WHITE INDEX VALUE
BLACK INDEX VALUE

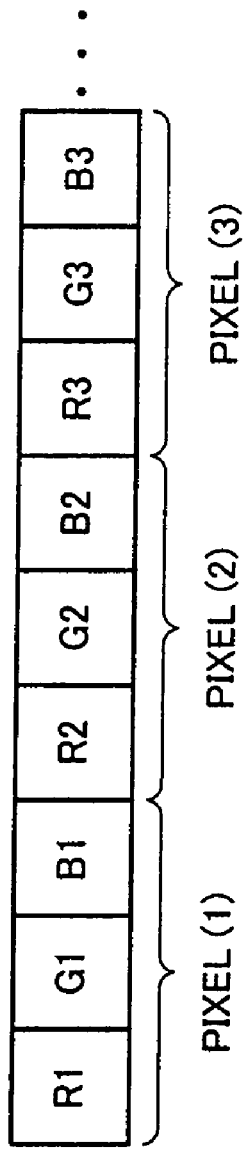
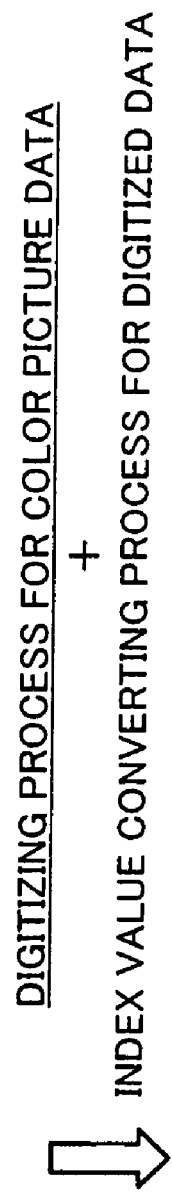
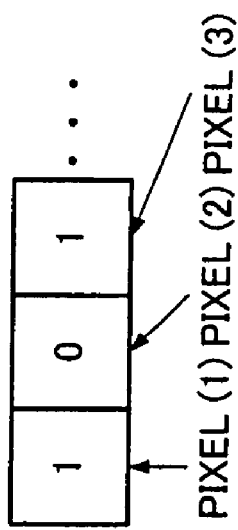
Fig. 9A
Fig. 9B

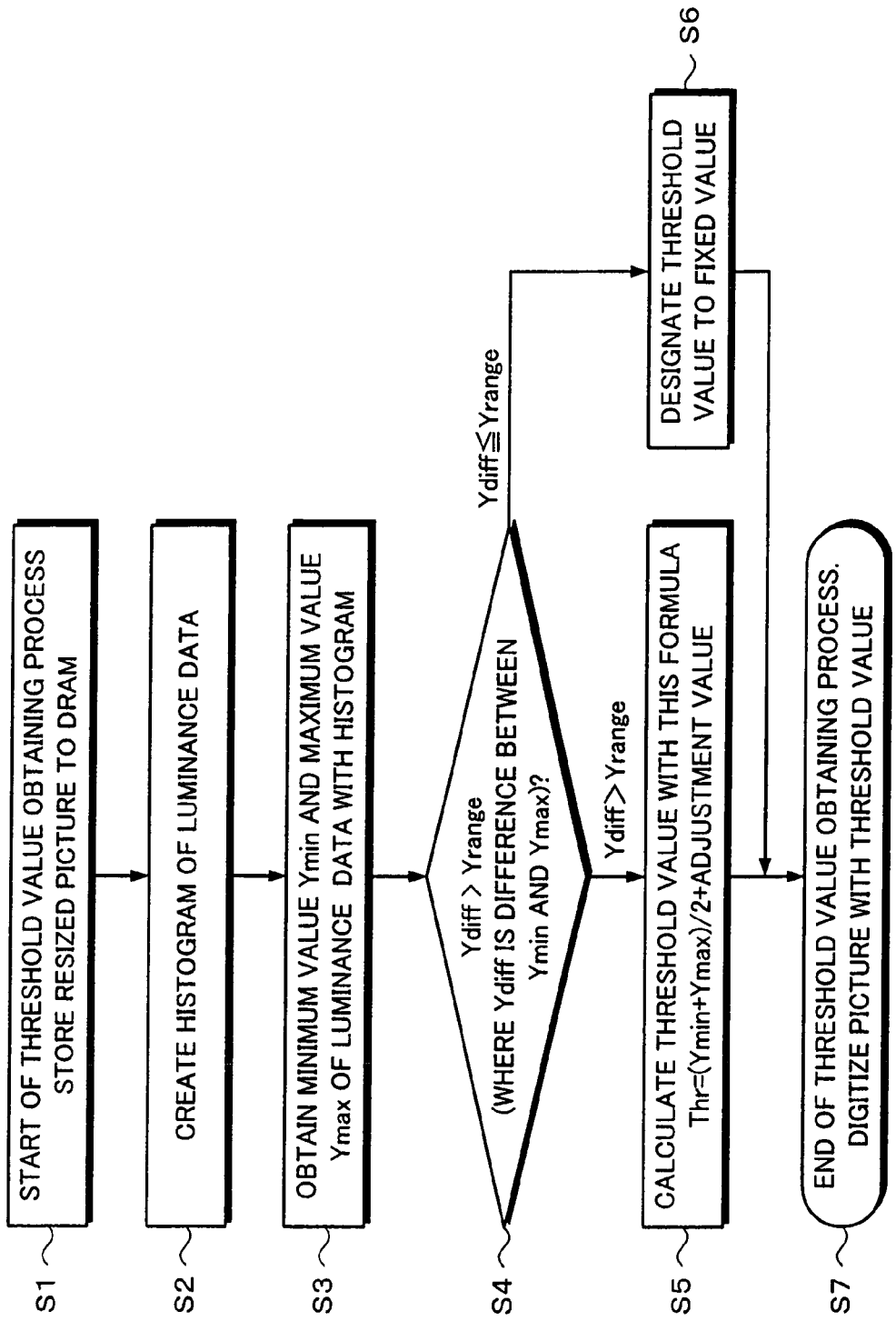

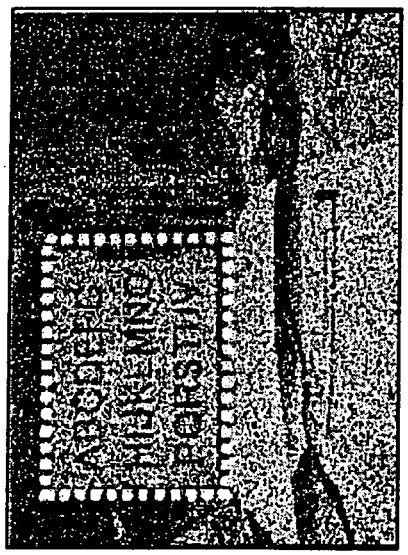
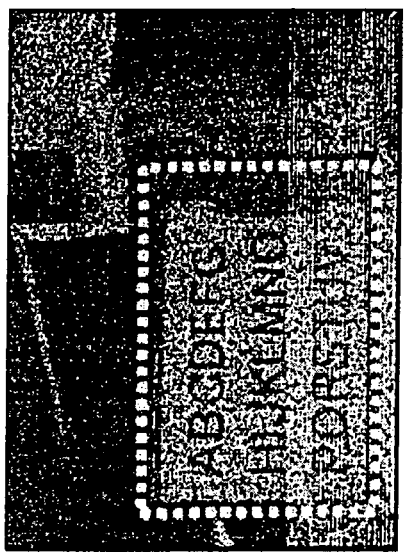
Fig. 17A
Fig. 17B

DIGITAL PICTURE SIGNAL PROCESSING APPARATUS, METHOD THEREOF, DIGITAL PICTURE RECORDING APPARATUS, METHOD THEREOF, TRANSMITTING METHOD THEREOF, AND DATA RECORD MEDIUM THEREOF

CROSS-REFERENCE TO RELATED APPLICATIONS

This application is a divisional of U.S. application Ser. No. 09/772,150, entitled "DIGITAL PICTURE SIGNAL PROCESSING APPARATUS, METHOD THEREOF, DIGITAL PICTURE RECORDING APPARATUS, METHOD THEREOF, TRANSMITTING METHOD THEREOF, AND DATA RECORD MEDIUM THEREOF," filed Jan. 29, 2001 now U.S. Pat. No. 6,961,460. Benefit of priority of the filing date of Jan. 29, 2001 is hereby claimed, and the disclosure of the Patent Application is hereby incorporated by reference.

BACKGROUND OF THE INVENTION

1. Field of the Invention

The present invention relates to a digital picture signal processing apparatus applicable to for example a digital camera apparatus, a method thereof, a digital picture recording apparatus, a method thereof, a transmitting method thereof, and a data record medium thereof.

2. Description of the Related Art

In recent years, a digital picture recording apparatus such as a digital still camera that records an object picture as picture data to a record medium such as a non-volatile semiconductor storage device (for example, a flash memory), a hard disk, or a floppy disk is becoming common. The digital picture recording apparatus converts a photographed object picture into a digital picture signal, compresses the digital picture signal, and records the compressed picture signal information to a record medium. A picture recording apparatus captures a natural picture as a color picture and compresses the captured picture corresponding to the JPEG format.

When a character manuscript, a white board, or the like is photographed, it is preferred to digitize the photographed color picture rather than directly record it as a color picture.

FIG. 1A shows a color picture of a photographed character manuscript. FIG. 1B shows a picture of which a color picture is converted into a digitized picture. As is clear from FIG. 1B, characters and the background of a digitized picture are more clearly distinguished than those of a color picture. Thus, characters can be easily read.

A conventional digital picture recording apparatus superimposes characters on a photographed color picture. However, when the character manuscript is photographed, it is not digitized. When a natural picture other than a character manuscript is photographed, it is preferred to record a color picture.

When a color picture is digitized, it is necessary to distinguish white and black of each pixel of the photographed color picture corresponding to a threshold value. FIG. 1B shows the case that an optimum threshold value is used. If a threshold value is much higher than an optimum threshold value, as shown in FIG. 1C, the entire digitized picture becomes dark. In contrast, when a threshold value is much lower than an optimum threshold value, as shown in FIG. 1D, the entire digitized picture becomes bright, thereby characters become illegible.

In particular, when a picture is photographed by a digital color picture recording apparatus, one of characters and a background picture does not have always a fixed value. Instead, since they can have any value of the color space, a fixed threshold value cannot be pre-designated.

When a picture is recorded by a digital picture recording apparatus, the user may designate the brightness and so forth of the picture. Thus, it is desired to obtain an optimum threshold value regardless of the value of the brightness designated by the user. In addition, when a threshold value is obtained, the value should be accurately and quickly obtained with a limited resource.

For example, when a threshold value is obtained with data of all pixel of a photographed picture, the following problem may take place. When there are a plurality of pictures having different numbers of pixels or sizes, the amount of data to be processed depends on the type of the number of pixels or the type of the size of the picture.

Thus, the time necessary for the threshold value obtaining process varies for each picture. In addition, since the number of pixels varies for each picture, a common threshold value obtaining algorithm cannot be used. In addition, since data of all pixels is used, the process time becomes long. When data of all pixels is used, noise and deterioration contained on the periphery of a picture and information of a peripheral substance adversely affect the threshold value calculating process. Thus, a threshold value cannot be correctly obtained. For example, a peripheral substance other than an object such as a character manuscript or a white board to be digitized may be contained in the picture. Consequently, a threshold value cannot be correctly obtained.

OBJECTS AND SUMMARY OF THE INVENTION

Therefore an object of the present invention is to provide a digital picture signal processing apparatus that allows a process suitable for a photographed picture of a natural picture or a process suitable for a photographed picture of a character manuscript to be selected as a process for a captured color picture, a method thereof, a digital picture recording apparatus, a method thereof, and a data record medium thereof.

Another object of the present invention is to provide a digital picture signal processing apparatus that allows an optimum threshold value for converting a captured color picture into a digitized picture to be accurately and quickly obtained with a limited resource, a method thereof, a digital picture recording apparatus, a method thereof, and a data record medium thereof.

To accomplish the above-described problem, a first aspect of the present invention is a digital picture signal processing apparatus, comprising a picture processing means for compressing a captured digital picture signal, and a mode designating means for generating a signal that designates a picture processing operation of the picture processing means to a first mode or a second mode, wherein when the first mode is designated, the picture processing means generates first compressed picture data of which the digital picture signal is compressed by a non-inversible encoding method, and wherein when the second mode is designated, the picture processing means generates second compressed picture data of which the digital picture signal is digitized and the digitized picture signal is compressed by an inversible encoding method.

A second aspect of the present invention is a digital picture recording apparatus for recording a picture as a digital signal to a record medium, comprising a picture capturing means for capturing a picture and generating a digital picture signal, a picture processing means for compressing the captured digital picture signal, a mode designating means for generating a signal that designates a picture processing operation of the picture processing means to a first mode or a second mode, and a recording means for recording an output signal of the picture processing means to a record medium, wherein when the first mode is designated, the picture processing means generates first compressed picture data of which the digital picture signal is compressed by a non-inversible encoding method, and wherein when the second mode is designated, the picture processing means generates second compressed picture data of which the digital picture signal is digitized and the digitized picture signal is compressed by an inversible encoding method.

A third aspect of the present invention is a digital picture signal processing method, comprising the steps of (a) compressing a captured digital picture signal, and (b) generating a signal that designates a picture processing operation performed at the step (a) to a first mode or a second mode, wherein when the first mode is designated, the step (a) is performed by generating first compressed picture data of which the digital picture signal is compressed by a non-inversible encoding method, and wherein when the second mode is designated, the step (a) is performed by generating second compressed picture data of which the digital picture signal is digitized and the digitized picture signal is compressed by an inversible encoding method.

A fourth aspect of the present invention is a digital picture recording method for recording a picture as a digital signal to a record medium, comprising the steps of (a) capturing a picture and generating a digital picture signal, (b) compressing the captured digital picture signal, (c) generating a signal that designates a picture processing operation performed at the step (b) to a first mode or a second mode, and (d) recording an output signal that is output at the step (b) to a record medium, wherein when the first mode is designated, the step (b) is performed by generating first compressed picture data of which the digital picture signal is compressed by a non-inversible encoding method, and wherein when the second mode is designated, the step (b) is performed by generating second compressed picture data of which the digital picture signal is digitized and the digitized picture signal is compressed by an inversible encoding method.

A fifth aspect of the present invention is a data record medium for recording a first picture file and a second picture file in such a manner that the first picture file and the second picture file are distinguishable, the first picture file being compressed in a non-inversible encoding method, the second picture file being compressed in an inversible encoding method.

A sixth aspect of the present invention is a digital picture processing apparatus for converting captured color picture information into a digitized picture, comprising a means for creating a histogram that represents the distribution of the number of pixels of luminance data of color picture information, and a means for detecting the maximum value and the minimum value of the histogram and deciding the intermediate value thereof as a threshold value, wherein the color picture is converted into a digitized picture with the threshold value of the intermediate value.

A seventh aspect of the present invention is a digital picture processing method for converting captured color picture information into a digitized picture, comprising the steps of (a) creating a histogram that represents the distribution of the number of pixels of luminance data of color picture information, and (b) detecting the maximum value and the minimum value of the histogram and deciding the intermediate value thereof as a threshold value, wherein the color picture is converted into a digitized picture with the threshold value of the intermediate value.

An eighth aspect of the present invention is a digital picture recording apparatus for recording a picture as a digital signal to a record medium, comprising a picture capturing means for capturing a color picture, a picture processing means for converting the captured color picture into a digitized picture corresponding to a threshold value, and a recording means for recording an output signal of the picture processing means to the record medium, wherein the picture processing means creates a histogram that represents the distribution of the number of pixels of luminance data of the color picture, detects the maximum value and the minimum value of the histogram, and converts the color picture signal into a digitized picture with the threshold value that is the intermediate value of the maximum value and the minimum value.

A ninth aspect of the present invention is a digital picture recording method for recording a picture as a digital signal to a record medium, comprising the steps of (a) capturing a color picture, (b) converting the captured color picture into a digitized picture corresponding to a threshold value, and (c) recording an output signal that is output at the step (b) to the record medium, wherein the step (b) is performed by generating a histogram that represents the distribution of the number of pixels of luminance data of the color picture, detecting the maximum value and the minimum value of the histogram, and converting the color picture signal into a digitized picture with the threshold value that is the intermediate value of the maximum value and the minimum value.

A tenth aspect of the present invention is a digital picture recording apparatus for recording a picture as a digital signal to a record medium, comprising a picture capturing means for capturing a color picture, a picture processing means for converting the captured color picture into a digitized picture corresponding to a threshold value, and a recording means for recording an output signal of the picture processing means to the record medium, wherein the picture processing means converts the captured color picture into a picture having a predetermined size or a predetermined number of pixels, decides a threshold value corresponding to the converted picture, and generates a digitized picture corresponding to the threshold value.

An eleventh aspect of the present invention is a digital picture recording apparatus for recording a picture as a digital signal to a record medium, comprising a picture capturing means for capturing a color picture, a picture processing means for converting the captured color picture into a digitized picture corresponding to a threshold value, and a recording means for recording an output signal of the picture processing means to the record medium, wherein the picture processing means thins out the captured color picture, generates a thinned picture, decides a threshold value corresponding to the thinned picture, and generates a digitized picture corresponding to the threshold value.

A twelfth aspect of the present invention is a digital picture recording apparatus for recording a picture as a digital signal to a record medium, comprising a picture capturing means for capturing a color picture, a picture processing means for converting the captured color picture into a digitized picture corresponding to a threshold value, and a recording means for recording an output signal of the picture processing means to the record medium, wherein the picture processing means decides a threshold value corresponding to a part including an object to be digitized selected from the captured color picture and generates a digitized picture corresponding to the threshold value.

A thirteenth aspect of the present invention is a digital picture recording method for recording a picture as a digital signal to a record medium, comprising the steps of (a) converting a captured color picture into a digitized picture corresponding to a threshold value, (b) recording the digitized picture to the record medium, (c) converting the captured color picture into a picture having a predetermined size or a predetermined number of pixels, (d) deciding a threshold value corresponding to the converted picture, and (e) generating a digitized picture corresponding to the threshold value.

A fourteenth aspect of the present invention is a digital picture recording method for recording a picture as a digital signal to a record medium, comprising the steps of (a) converting a captured color picture into a digitized picture corresponding to a threshold value, (b) recording the digitized picture to the record medium, (c) thinning out the captured color picture so as to generate a thinned picture, (d) deciding a threshold value corresponding to the thinned picture, and (e) generating a digitized picture corresponding to the threshold value.

A fifteenth aspect of the present invention is a digital picture recording method for recording a picture as a digital signal to a record medium, comprising the steps of (a) converting a captured color picture into a digitized picture corresponding to a threshold value, (b) recording the digitized picture to the record medium, (c) deciding a threshold value corresponding to a part including an object to be digitized selected from the captured color picture, and (d) generating a digitized picture corresponding to the threshold value.

A sixteenth aspect of the present invention is a digital picture transmitting method for transmitting a picture as a digital signal to a communication medium, comprising the steps of (a) converting a captured color picture into a digitized picture corresponding to a threshold value, (b) transmitting the digitized picture to the communication medium, (c) converting the captured color picture into a picture having a predetermined size or a predetermined number of pixels, (d) deciding a threshold value corresponding to the converted picture, and (e) generating a digitized picture corresponding to the threshold value.

A seventeenth aspect of the present invention is a digital picture transmitting method for transmitting a picture as a digital signal to a communication medium, comprising the steps of (a) converting a captured color picture into a digitized picture corresponding to a threshold value, (b) transmitting the digitized picture to the communication medium, (c) thinning out the captured color picture so as to generate a thinned picture, (d) deciding a threshold value corresponding to the thinned picture, and (e) generating a digitized picture corresponding to the threshold value.

An eighteenth aspect of the present invention is a digital picture transmitting method for transmitting a picture as a digital signal to a communication medium, comprising the steps of (a) converting a captured color picture into a digitized picture corresponding to a threshold value, (b) transmitting the digitized picture to the communication medium, (c) deciding a threshold value corresponding to a part including an object to be digitized selected from the captured color picture, and (d) generating a digitized picture corresponding to the threshold value.

According to the present invention, when a photographed picture is a natural picture, the picture is compressed corresponding to a non-invertible encoding method. On the other hand, when characters and/or figures of a character manuscript or a white board are photographed, the photographed picture is digitized and then the digitized picture is compressed corresponding to an inversible encoding method. Thus, a picture whose characters are clear and distinguished from the background can be obtained.

In addition, according to the present invention, a histogram of luminance data is created for each captured color picture. The captured picture is digitized with a threshold value that is an intermediate value between the maximum value and the minimum value. Thus, each picture can be digitized with an optimum threshold value.

In addition, according to the present invention, a threshold value is obtained with a resized picture regardless of the size of a picture to be recorded, the algorithm for obtaining a threshold value can be used in common. Thus, the process time can be prevented from varying.

In addition, according to the present invention, since a threshold value is obtained with a thinned-out picture, a threshold value can be quickly obtained. By varying the thinout process corresponding to an object, a threshold value can be obtained with a minimum amount of data.

In addition, according to the present invention, a threshold value is obtained with information of a part of a picture rather than data of the entire picture. Thus, a correct threshold value that allows a desired portion to be optimally digitized can be obtained without an influence of unnecessary information. In addition, the user can freely designate a desired portion of a picture. Thus, the user can freely select a portion for which he or she wants to digitize.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 4A to 4C are schematic diagram for explaining the size of compressed data according to the embodiment of the present invention;

FIGS. 6A to 6C are schematic diagrams for explaining examples of a digitizing process for a photographed picture of a character manuscript or the like and a GIF file creating process;

FIG. 7 is a schematic diagram for explaining an example of a converting process for converting a photographed picture of a character manuscript into a GIF file;

FIG. 8 is a schematic diagram for explaining a data stream of which GIF data blocks are compressed;

FIGS. 9A and 9B are schematic diagrams for explaining examples of a digitizing process for a photographed picture of a character manuscript or the like and a GIF file creating process;

FIG. 10 is a flow chart for explaining a threshold value obtaining process according to the embodiment of the present invention;

FIGS. 17A and 17B are schematic diagrams for explaining another embodiment of the present invention;

DETAILED DESCRIPTION OF THE PREFERRED EMBODIMENTS

Figure 1A:
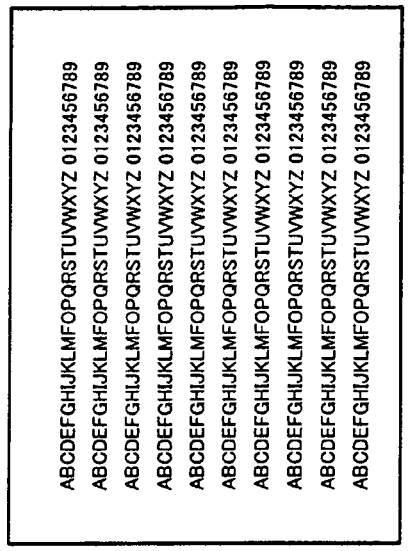
FIGS. 1A to 1D are schematic diagrams for explaining a threshold value with which a character manuscript is digitized.
Figure 1B:
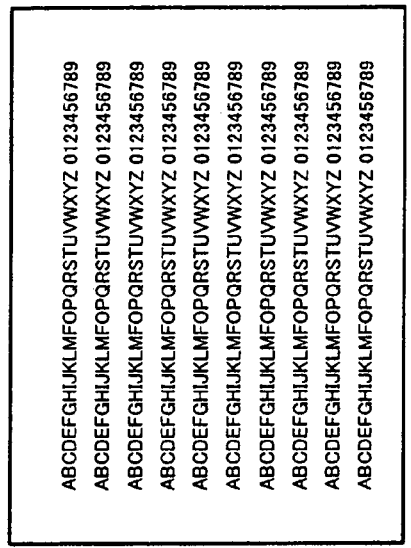
Figure 1C:
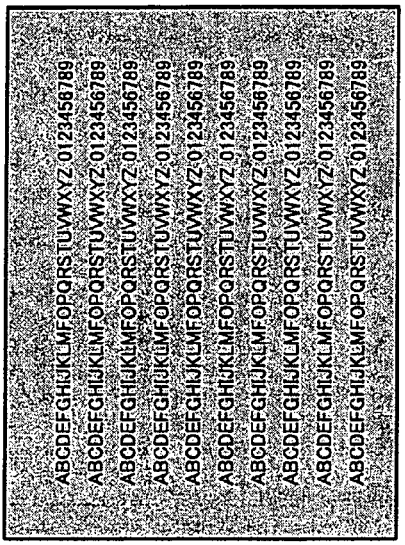
Figure 1D:
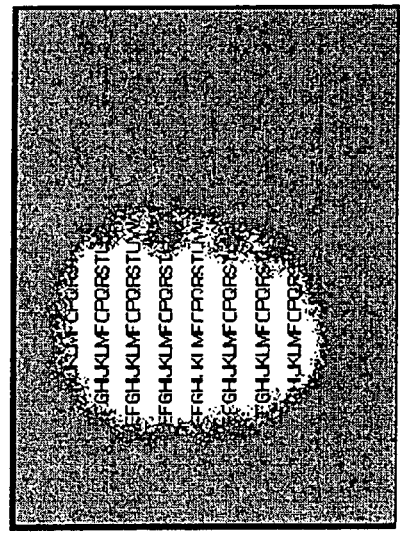
Figure 2:
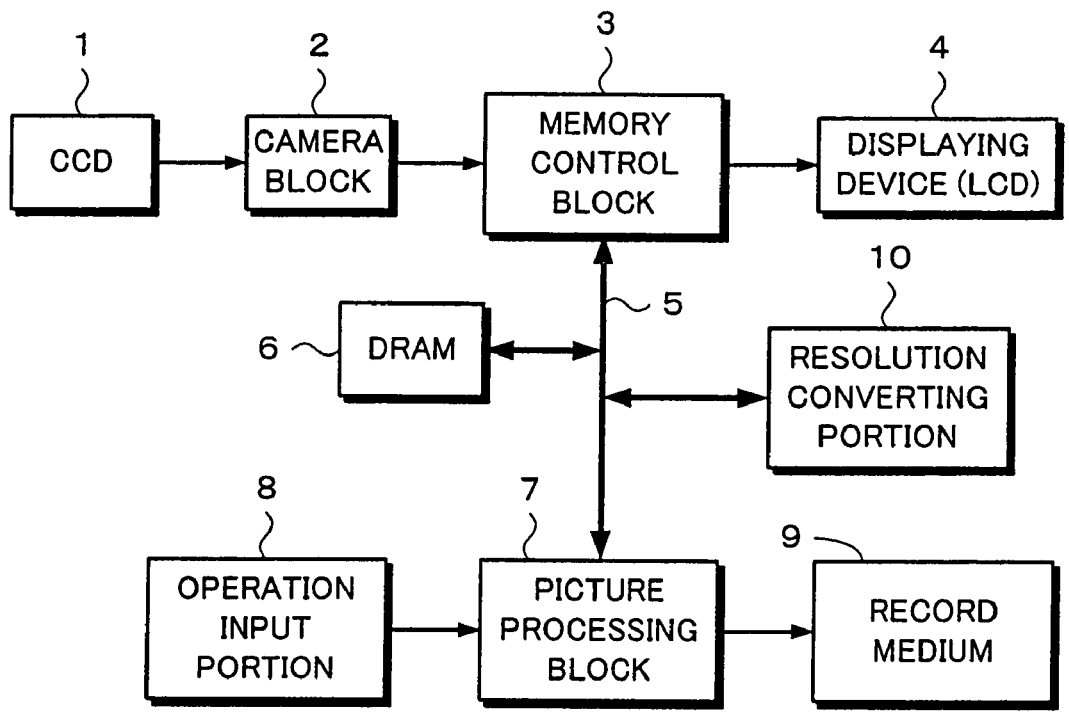
FIG. 2 is a block diagram showing the overall structure of an embodiment of the present invention.

Next, an embodiment of the present invention will be described. FIG. 2 shows the structure of a system according to the embodiment of the present invention. Reference numeral 1 is a CCD (Charge Coupled Device). The number of horizontal pixels and the number of vertical pixels of the CCD 1 are for example 1600×1280 in UXGA. On the other hand, the number of horizontal pixels and the number of vertical pixels of a recorded picture against a photographed picture are selectable from 1280×960 in SXGA, 1024×768 in XGA, and 640×480 in VGA as well as 1600×1280 in UXGA. The CCD 1 outputs an object image as a photograph signal through a lens portion (not shown). The lens portion performs an automatic aperture controlling operation and an automatic focus controlling operation. The photograph signal is supplied to a camera block 2.

As with an image scanner, the CCD 1 may perform a document reading operation. It should be noted that the present invention can be applied to the case that a digital color picture received from a communication medium other than the CCD is processed. Moreover, the present invention can be applied to the case that a processed picture is transmitted to a communication medium, not recorded to a record medium.

The camera block 2 comprises a clamping circuit, a luminance signal processing circuit, a contour compensating circuit, a defect compensating circuit, an automatic aperture controlling circuit, an automatic focus controlling circuit, and an automatic white balance compensating circuit. The camera block 2 generates a digital photograph signal as a composite signal composed of a luminance signal and color difference signals that have been converted from an RGB signal. The digital photograph signal is supplied to a memory control block 3.

The memory control block 3 comprises a signal switching portion, a display buffer memory, and a D/A converter. A displaying device 4 and a data transmission path 5 are connected to the memory control block 3. The memory control block 3 generates an RGB signal and supplies it to the displaying device 4 through the D/A converter. The displaying device 4 is composed of for example an LCD (Liquid Crystal Display) that is built in a camera. A picture signal is supplied from the camera block 2 to the displaying device 4. Thus, the displaying device 4 displays a picture that is being photographed. In addition, the displaying device 4 displays a picture that is being read from the record medium 9 supplied through the data transmission path 5. The displaying device 4 displays a VGA (640×480 pixels) picture.

A picture processing block 7 is connected to the data transmission path 5. The picture processing block 7 is composed of a DRAM (Dynamic Random Access Memory) 6 and a microcomputer. The DRAM 6 is controlled by the memory control block 3 or the picture processing block 7. The DRAM 6 has an area for an original picture supplied through the memory control block 3 and an area for picture data that has been processed by the picture processing block 7. An operation input portion 8 and the record medium 9 are connected to the picture processing block 7 through respective interfaces. Control information is supplied from the picture processing block 7 to each portion. As a result, the picture data is processed. The processed data is written and read to/from the DRAM 6 and record medium 9.

The operation input portion 8 comprises a shutter button, a mode selection switch, and other user's switches. The operation input portion 8 allows the user to select a first mode as a natural picture photographing mode or a second mode as a character photographing mode for such as a white board. A signal corresponding to the operation of the operation input portion 8 is supplied to the picture processing block 7. The record medium 9 is for example a memory card (IC card), a floppy disk, or a rewritable optical disc. The record medium 9 is attachable and detachable to/from the still camera main body. Instead of the record medium 9, a communication medium such as Internet can be used.

The picture processing block 7 performs different picture processes for the first mode as the natural picture photographing mode and the second mode as the character picture photographing mode. In the first mode, the picture processing block 7 uses for example the JPEG (Joint Photographic Expert Group) method. In the second mode, the picture processing block 7 digitizes the picture, compresses the digitized data corresponding to the LZW (Lempel Ziv Welch) method, adds necessary structural elements to the compressed data, and converts the digitized picture into a GIF file.

The JPEG method is a standard encoding method for encoding a color still picture. The JPEG method is categorized as an inversible encoding method and a non-inversible encoding method. As the inversible encoding method, intra-space predictive encoding method is used. As the non-inversible encoding method, DCT (Discrete Cosine Transform) compressing method is used. Normally, deterioration of picture quality in the non-inversible encoding method is practically omissible. Thus, the DCT encoding method is used in the JPEG method. Hereinafter, the JPEG represents the non-inversible encoding method of which coefficient data generated in DCT is quantized and the quantized output data is entropy-encoded.

In addition, the picture processing block 7 controls the reading operation and the writing operation of data against the record medium 9. In other words, the picture processing block 7 outputs a JPEG file obtained in the first mode or a GIF file obtained in the second mode to the record medium 9. The picture processing block 7 stores a picture file that is read from the record medium 9 to the DRAM 6.

In addition, the system further comprises a resolution converting portion 10. The resolution converting portion 10 converts the resolution of the selected recorded picture. The DRAM 6 stores the resultant picture. The resolution converting process may be performed by the picture processing block 7 instead of the resolution converting portion 10.

According to the above-described embodiment, when the user presses the shutter button (of the operation input portion 8), a color picture signal of a picture that is photographed by the CCD 1 is supplied to the camera block 2. The camera block 2 performs a signal process for the color picture signal. The resolution of the original picture data is converted and then the resultant data is stored to the DRAM 6 under the control of the memory control block 3.

When the original picture data is stored to the DRAM 6, the picture processing block 7 processes the original picture data. The compressed picture data (as a JPEG file or a GIF file) is stored to the other area of the DRAM 6. The picture processing block 7 writes the compressed picture signal that is read from the DRAM 6 to the record medium 9.

When the compressed picture data is recorded, the picture processing block 7 assigns a file name thereto. When the record medium 9 is a memory card, a still picture directory (DCIM) is created. The still picture directory (DCIM) contains sub directories such as MSDCF. A sub directory is equivalent to an album. One picture that has been compressed corresponding to the JPEG method is assigned a file name and an extension that are for example DCS00001.jpg in a sub direction for example 100MSDCF. When picture data recorded to the memory card is a GIF file, a file name and an extension that are TXT00002.gif are assigned in the same directory and the same sub directory. DSC0 and TXT0 are followed by numbers from (0001) to (9999).

When a picture stored in the record medium 9 is reproduced, a file name thereof is designated. As a result, a desired compressed picture signal is read from the record medium 9. The compressed picture data that is read from the record medium 9 is decompressed by the picture processing block 7. The decompressed picture data is written to the DRAM 6. The picture data stored in the DRAM 6 is displayed on the displaying device 4 through the memory control block 3.

Next, the picture process in the second mode mainly for a character manuscript will be described. In the second mode, the picture processing block 7 performs the digitizing process for the picture. In other words, the picture processing block 7 calculates an optimum threshold value corresponding to color picture data stored in the DRAM 6. Corresponding to the threshold value, the picture processing block 7 converts the color picture data into digitized data (white and black). In reality, the picture processing block 7 digitizes luminance data of the color picture data. Although the CCD 1 can perform a digitizing process for color picture data, the picture processing block 7 can designate a threshold value in addition to the digitizing process.

As will be described later, the picture processing block 7 checks the distribution of luminance data for each picture that is processed and calculates a threshold value that allows characters and a background thereof to be distinguished. For example, the picture processing block 7 adjusts the average value of the maximum value and minimum value of luminance data with an adjustment value and obtains the adjusted value as a threshold value. When a threshold value is obtained, it is preferred that picture data is thinned out or only a center portion thereof is used rather than all pixels of the original picture.

Thereafter, data is compressed corresponding to the LZW method and outputs the compressed data as a GIF file. In the LZW method, patterns having any lengths of a data stream are registered to a dictionary (code table). When a pattern that has been registered in the dictionary appears, a registered number thereof is encoded and output as a variable length code. Before data is encoded, it is not necessary to edit a dictionary for registering patterns. Instead, while data is being read, the dictionary is created.

Figure 3:
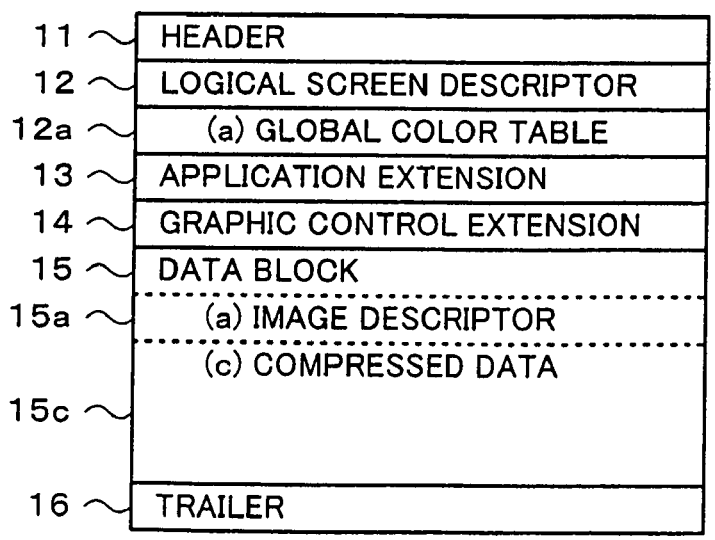
FIG. 3 is a schematic diagram showing the structure of a GIF file according to the embodiment of the present invention.

A GIF file is created with compressed data. Next, the structure of a GIF file will be practically described. FIG. 3 shows an example of the structure of a conventional GIF file. Referring to FIG. 3, a GIF file is mainly composed of a header block 11, a logical screen descriptive block 12, an application extension block 13, a graphic control extension block 14, an image data block 15, and a trailer block 16.

The header block 11 is composed of for example 6 bytes. A GIF file starts with a header block 11. A header block 11 represents that the current data stream is in a GIF format. A header block 11 is composed of a signature field and a version field. The signature field represents the beginning of the data stream. The version field is necessary for completely performing the decoding process. One data stream should have one header block.

A header block 11 is followed by a logical screen descriptive block 12. A logical screen descriptive block 12 defines parameters (size, aspect ratio, and color depth) necessary for defining an image plane (display device) that renders an image. In addition, a logical screen descriptive block 12 defines the presence/absence of a global color table and various parameters. A logical screen descriptive block 12 is also essential. Thus, one data stream should contain one logical screen descriptive block.

A logical screen descriptive block 12 is followed by a global color table block 12*a*. A color table is a pallet that represents RGB values (3 bytes=24 bits each) of all colors of the picture. Since a GIF file supports up to 256 colors, the global color table contains up to 256×3 bytes. The global color pallet is a default pallet that is used only when an image does not have a dedicated local pallet. Although the global color table block 12*a* is optional, the number of global color tables designated in one data stream is limited to one.

A global color table block 12*a* is followed by an application extension block 13. An application extension block 13 contains special information that allows only a particular application to perform a special process for image data.

An application extension block 13 is followed by a graphic control extension block 14. A graphic control extension block 14 contains parameters for controlling a picture displaying method. The parameters are applicable for only an image that is preceded by them. Without the application extension block 13, a GIF file can be created. Only one graphic control extension block 14 can be followed by image data.

A graphic control extension block 14 is followed by an image data block 15. Each image of the data stream is composed of an image descriptive block 15*a* and compressed data 15*c*.

An image descriptive block 15*a* contains a parameter necessary for processing an image on the table. The image descriptive block 15*a* designates coordinates of a logical screen in the unit of pixel. An image descriptive block 15*a* is a graphic rendering block. An image descriptive block 15*a* may be preceded by one or more control blocks such as a graphic limit/extension block or followed by a local color table. An image descriptive block 15*a* is always followed by compressed data 15*c*. In other words, an image descriptive block 15*a* is essential for an image. One image descriptor can be designated for images contained in each data stream. The number of images contained in one data stream is not limited.

Compressed data 15*c* of the table is composed of a sequence of sub blocks. Each sub block of compressed data 15*c* is composed of up to 255 bytes including an index of a color table.

Graphic control extension blocks 14 and image data blocks 15 are repeated a number of times corresponding to the number of images. A GIF file ends with a trailer block 16. A trailer block 16 is a block composed of a single field that represents the end of a GIF data stream. A GIF file always ends with a trailer block 16. A trailer block 16 cannot be changed.

To create an image data block 15, an original picture is converted into a digitized picture and then converted into an index value that represents a color pallet number of a GIF file. As will be described later, the digitizing process and the index value converting process may be performed at a time. In that case, the memory for the digitizing process can be effectively used.

As was described above, according to the present invention, data is compressed corresponding to the LZW method. According to the LZW method, as the number of patterns of a data stream is small, the probability of which a pattern matches one that is registered in the dictionary becomes high. Thus, the compression ratio can be increased. A digitized picture is a data stream composed of only two values (0 and 1). The number of patterns that take place is much smaller than that of a color picture. Thus, the compression ratio can be increased. In other words, after picture data is compressed, the data size becomes small.

FIG. 4A shows an example of captured original color picture data. In the case of (640×480) pixels, the data size of a captured original color picture is around 370 kB (kilo-bytes). When the color picture is compressed corresponding to the JPEG method, in the case of the picture (640×480) shown in FIG. 4B, the data size thereof becomes around 70 kB.

According to the embodiment, when data is compressed corresponding to the LZW method and converted into a GIF file, in the case of the picture (640×480) pixels shown in FIG. 4C, the data size thereof becomes around 10 kB. Thus, in the JPEG method, the compression ratio is in the range from around 1/40 to 1/5. On the other hand, in the LZW method, the compression ratio is as low as for example 1/30.

In addition, according to the LZW method, a pre-compressed data stream can be fully restored using a sequence of registered numbers of the dictionary. In other words, the LZW method is an inversible compressing method of which original data can be restored from compressed data. On the other hand, the JPEG method is a non-inversible compressing method. Since the number of colors of a digitized picture is very small and it contains many sharp edges, when picture data is compressed corresponding to the JPEG method, a decompressed picture contains much noise. The picture quality of a GIF file is superior to that of a JPEG picture.

Figure 5A:
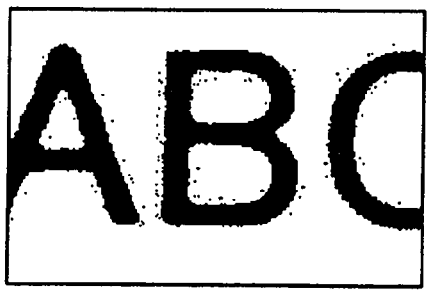
FIGS. 5A and 5B are schematic diagrams for explaining the difference of picture qualities corresponding to compression encoding methods according to the embodiment of the present invention.
Figure 5B:
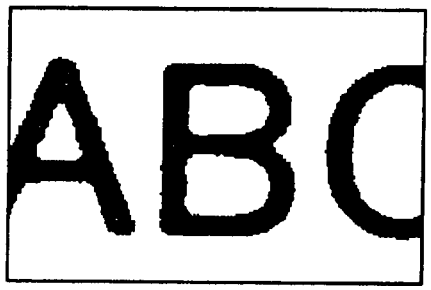

FIG. 5A shows an enlarged view of a picture of which a digitized picture that has been compressed and recorded corresponding to the JPEG method is decompressed. FIG. 5B shows an enlarged view of a picture of which a digitized picture that has been compressed and recorded as a GIF file corresponding to the LZW method is decompressed. Referring to FIG. 5A, in the picture recorded corresponding to the JPEG method, foggy noise takes place around an edge of a character. On the other hand, referring to FIG. 5B, in the picture recorded as a GIF file, no foggy noise takes place around an edge of a character. Thus, according to the LZW method, a clearer picture can be obtained.

Next, an example of the process for converting a digitized picture into a GIF file will be described. A GIF file is created with blocks shown in FIG. 3. Next, with reference to FIG. 6, an example of such a process will be described.

FIG. 6A shows a data stream of a captured color picture. One pixel is represented with three RGB bytes. Next, the color picture is digitized. As shown in FIG. 6B, a stream of the digitized picture data is obtained. In the digitizing process, pixel data that represents black is converted into (R=G=B=0). On the other hand, pixel data that represents white is converted into (R=G=B=255). Thereafter, as shown in FIG. 6C, the RGB values are converted into index values 0 (black) and 1 (white) that represent a color pallet.

The process shown in FIGS. 6A to 6C is composed of two converting processes. In the first converting process, an original color picture is converted into a digitized picture. In the second converting process, the digitized picture is converted into an index value. Since two converting processes are performed, the process time becomes long. In addition, the memory (DRAM 6) cannot be effectively used. To solve such problems, according to the embodiment of the present invention, the digitizing process and the GIF file creating process are performed in the following manner.

It can be predetermined that colors of the global color table block 12a shown in FIG. 3 are only white and black because of a digitized picture. In other words, it can be predetermined that as shown in FIG. 7, the index value 0 corresponds to black (R, G, B=0), whereas the index value 1 corresponds to white (R, G, B=255). When each component of a color picture is represented by Y (luminance signal), Cb (color difference signal of blue), and Cr (color difference signal of red), the present invention can be also applied. In such a case, information that represents black is (Y=0, Cb=Cr=128), whereas information that represents white is (Y=255, Cb=Cr=128).

In the data block 15, a stream of index values as color pallet numbers that represent the color of each pixel of the original picture is compressed corresponding to the LZW method rather than the data stream of the original picture. In the case of a digitized picture of white and black having a color table shown in FIG. 7, a stream composed of two index values "0" and "1" is compressed as shown in FIG. 8.

Thus, in the case of a digitized picture, white and black pixels are pre-designated to index values "0" and "1", respectively. Consequently, when the digitizing process for a data stream of an original color picture and the index value converting process are performed at a time, a stream of index values shown in FIG. 9B is obtained. Thus, since the processes shown in FIGS. 6A to 6C can be simplified, the process time becomes short. In addition, since each pixel of the original picture information is represented with three bytes, after the first converting process is performed, data requires a memory area of three bytes per pixel as shown in FIG. 6B. On the other hand, in the process shown in FIGS. 9A and 9B, after the first converting process is performed, since data becomes a stream of index values, the data requires a memory area of only one byte per pixel in the process shown in FIGS. 9A and 9B. Thus, the memory (DRAM 6) can be effectively used.

Next, an example of a threshold value obtaining process used for the digitizing process performed by the picture processing block 7 will be described. FIG. 10 is a flow chart showing the threshold value obtaining process. At step S1, the threshold value obtaining process is started and a resized picture is stored to the DRAM 6. A histogram of luminance data of the picture stored in the DRAM 6 is created (at step S2). The created histogram is stored in for example a memory of the picture processing block 7.

Figure 11:
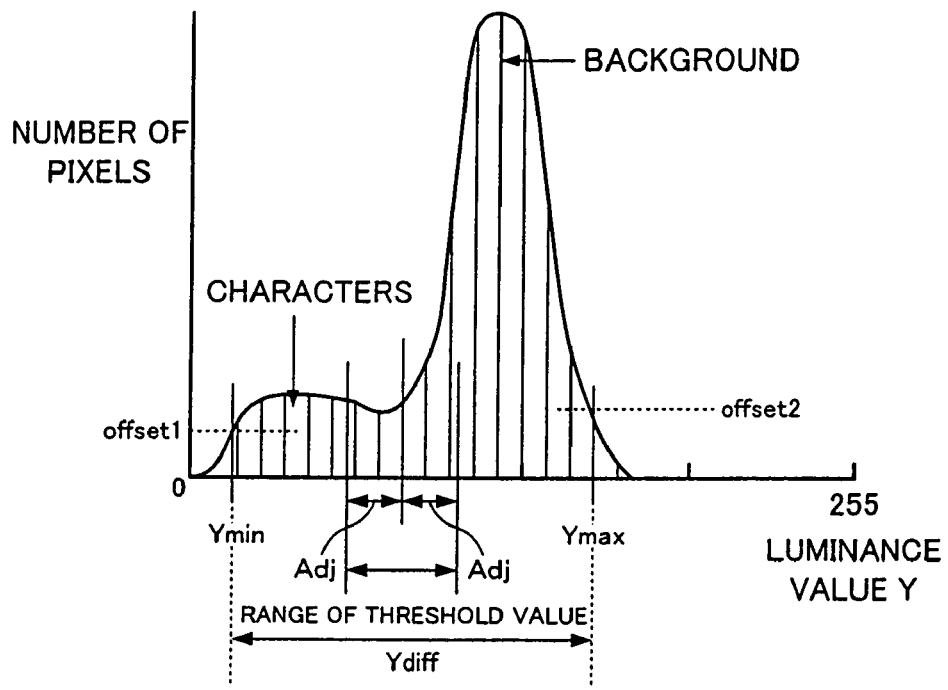
FIG. 11 is a schematic diagram showing an example of a histogram used in the threshold value obtaining process.

FIG. 11 shows an example of a created histogram. The horizontal axis represents the level of luminance data (in the range from 0 to 255 for 8-bit data), whereas the vertical axis represents the number of pixels. When black characters are photographed with a white background, a high peak corresponding to the background appears on the white side. In addition, a low peak corresponding to the characters appear on the black side. When characters of a white chalk are written on a black board, although the heights of the peaks become reverse of those shown in FIG. 11, it is not necessary to change the threshold value obtaining process.

At step S3, the minimum value Ymin and the maximum value Ymax are obtained from the histogram. In that case, a black side offset value offset1 and a white side offset value offset2 are designated so as to remove noise and invalid pixel data from the picture. In such a condition, the minimum value Ymin and the maximum value Ymax are obtained. More practically, the histogram is traced from (Y=0) upward (rightward in FIG. 11). When the number of pixels exceeds offset1, Ymin is obtained. Likewise, the histogram is traced from (Y=255) downward (leftward in FIG. 11). When the number of pixels exceeds offset2, Ymax is obtained. In other words, the minimum value Ymin is obtained at the intersection of the offset1 and the histogram, whereas the maximum value Ymax is obtained at the intersection of the offset2 and the histogram.

At step S4, the difference Ydiff (=Ymax−Ymin) is obtained. The difference Ydiff is compared with a pre-designated limit range Yrange. When the relation of Ydiff>Yrange is satisfied, the flow advances to step S5. At step S5, the threshold value Thr is calculated with the following formula (1).

$$Thr=(Ymin+Ymax)/2 \quad (1)$$

Although the threshold value can be almost accurately obtained with the formula (1), depending on the setting method for a photograph picture in the camera portion, when the threshold value is slightly adjusted, a clear digitized picture may be obtained. In such a case, a term about an adjustment value is added to the formula (1) as a new threshold value Thr. Denoting the threshold value by Thr and the range of the adjustment value by ±Adj, the threshold value Thr can be calculated with the following formula (2).

$$Thr=(Ymin+Ymax)/2 \pm Aaj \quad (2)$$

A histogram is created for each captured picture. Corresponding to the created histogram, the maximum value and the minimum value are obtained for each picture. The threshold value Thr is decided using the formula (2). Thus, when the setting of the camera portion is changed (for example, the overall brightness is adjusted), even if the peak position of the histogram of the captured picture varies, an optimum threshold value corresponding to the picture can be obtained.

Figure 12:
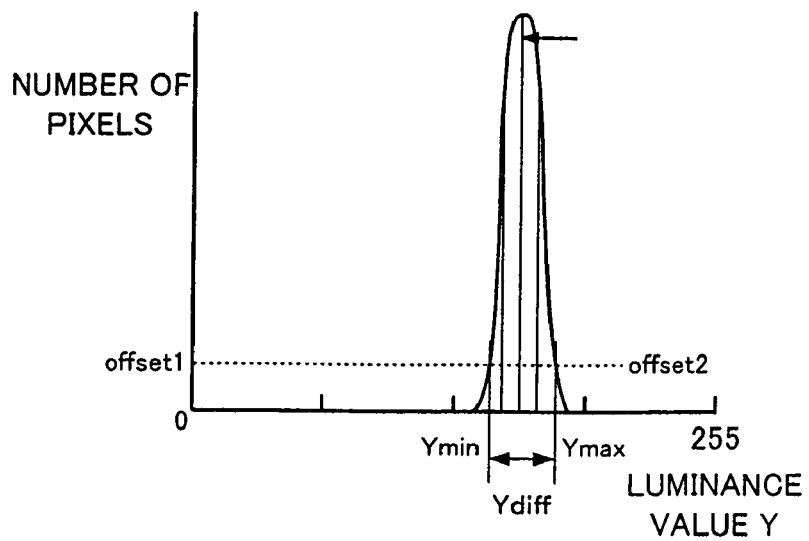
FIG. 12 is a schematic diagram showing another example of the histogram used in the threshold value obtaining process.

At step S4, when the obtained difference Ydiff is equal to or smaller than the designated range Yrange, the threshold value is designated to a fixed value (at step S6). When the difference Ydiff of a picture is equal to or smaller than Yrange, as shown in FIG. 12, it can be estimated that the picture creates a histogram with only one peak (namely, a picture containing only a background rather than characters). Since a threshold value of such a picture cannot be obtained with the formula (1) or (2), a pre-designated fixed value is used as a threshold value. For example, the intermediate value (128) of the luminance signal of eight bits is used as such a fixed value.

Thus, the threshold value obtaining process is completed. With the obtained threshold value Thr, the captured picture is digitized (at step S7). In the threshold value obtaining process, an adjustment value that is an offset value or an intermediate value depends on the characteristic of a photographed picture. Thus, the adjustment value depends on each digital picture recording apparatus. Consequently, to allow the dependency of the digital picture recording apparatus to decrease and the generality of those values to be maintained, they can be designated to any values.

In the above-described threshold value obtaining process, to shorten the process time of the histogram creating process of luminance data, the size of record picture is reduced to the size of a VGA picture regardless of the number of pixels of a recorded picture. With the reduced picture, a histogram can be created. Alternatively, with a center portion of a captured picture, a histogram may be created. Next, such an operation will be described.

Figure 13:
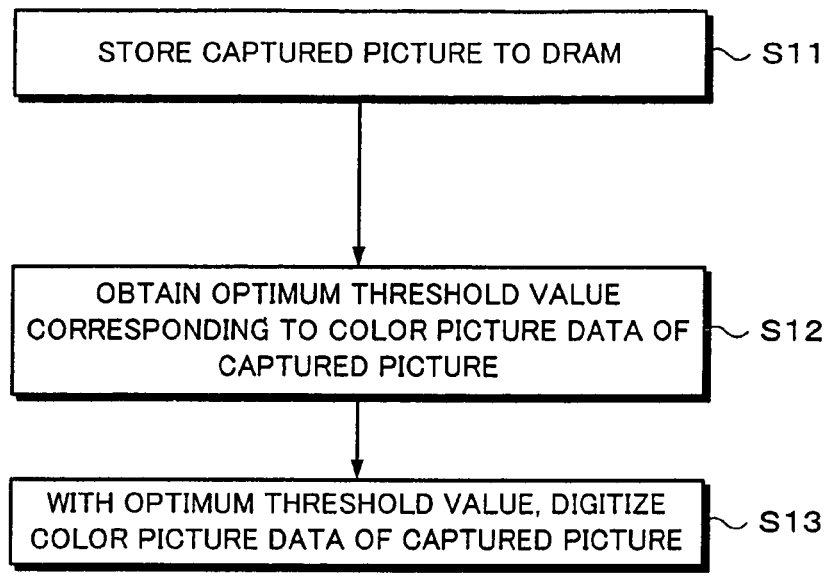
FIG. 13 is a flow chart for explaining the digitizing process according to the embodiment of the present invention.

First of all, for easy understanding of the present invention, the digitizing process in the case that a threshold value is obtained with data of all pixels will be described with reference to FIG. 13. At step S11, a captured picture is stored to the DRAM 6. The captured picture is a recorded picture having a predetermined size or a predetermined number of pixels. At step S13, an optimum threshold value is calculated corresponding to the color picture data of the captured picture. At step S14, with the obtained optimum threshold value, the color picture data of the captured picture is digitized.

The size or the number of pixels of a picture that is recorded can be selected by the user. For example, the user can select one of SXGA, XGA, and VGA as the size of the recorded picture. The number of pixels is converted by the resolution converting portion 10. Thus, the picture that is stored to the DRAM 6 depends on the size that is selected before the picture is photographed. As a result, the number of pixels stored in the DRAM 6 varies. Instead of the resolution converting portion 10, the picture processing block 7 may convert the number of pixels.

When data of all pixels is used, since the picture stored in the DRAM 6 is used, the number of calculations and process time vary depending on the number of pixels. When the sizes of pictures are different, a common algorithm for obtaining a threshold value cannot be used. When a histogram is used for obtaining a threshold value, since the number of pixels varies corresponding to the size of a picture, for example a process for normalizing a histograms is required.

Figure 14:
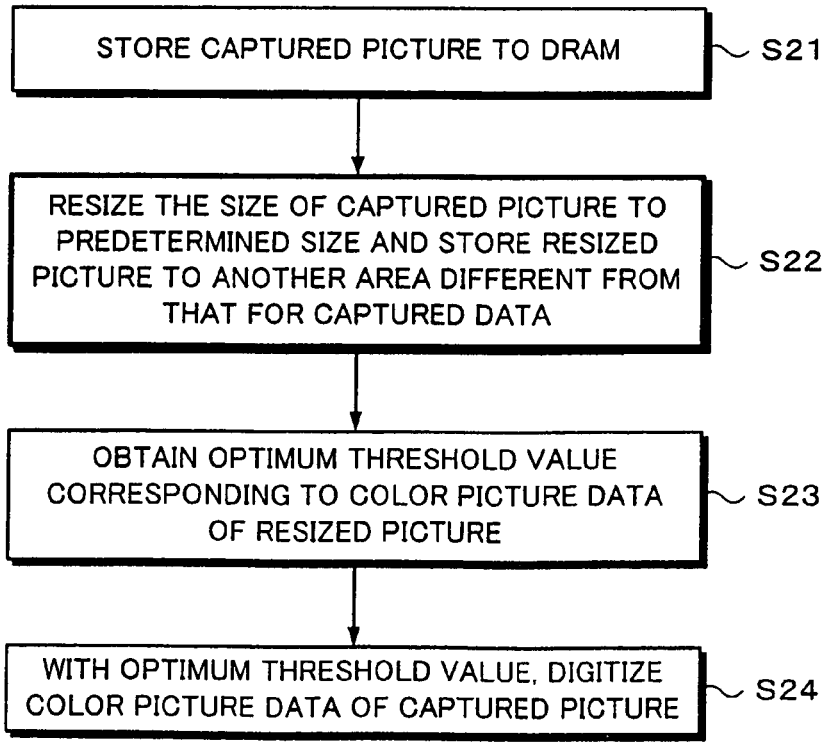
FIG. 14 is a flow chart for explaining the digitizing process according to the embodiment of the present invention.

FIG. 14 shows a process for solving such a problem according to the embodiment of the present invention. At step S21, a captured picture is stored to the DRAM 6. Thereafter, the size of the captured picture is resized to a predetermined size. The resized picture is stored to another area different from the area for the captured picture of the DRAM 6 (at step S22). The resizing process is a process for accurately reducing the size of the original picture and relatively reducing the amount of data without varying color information of a picture.

Figure 15:
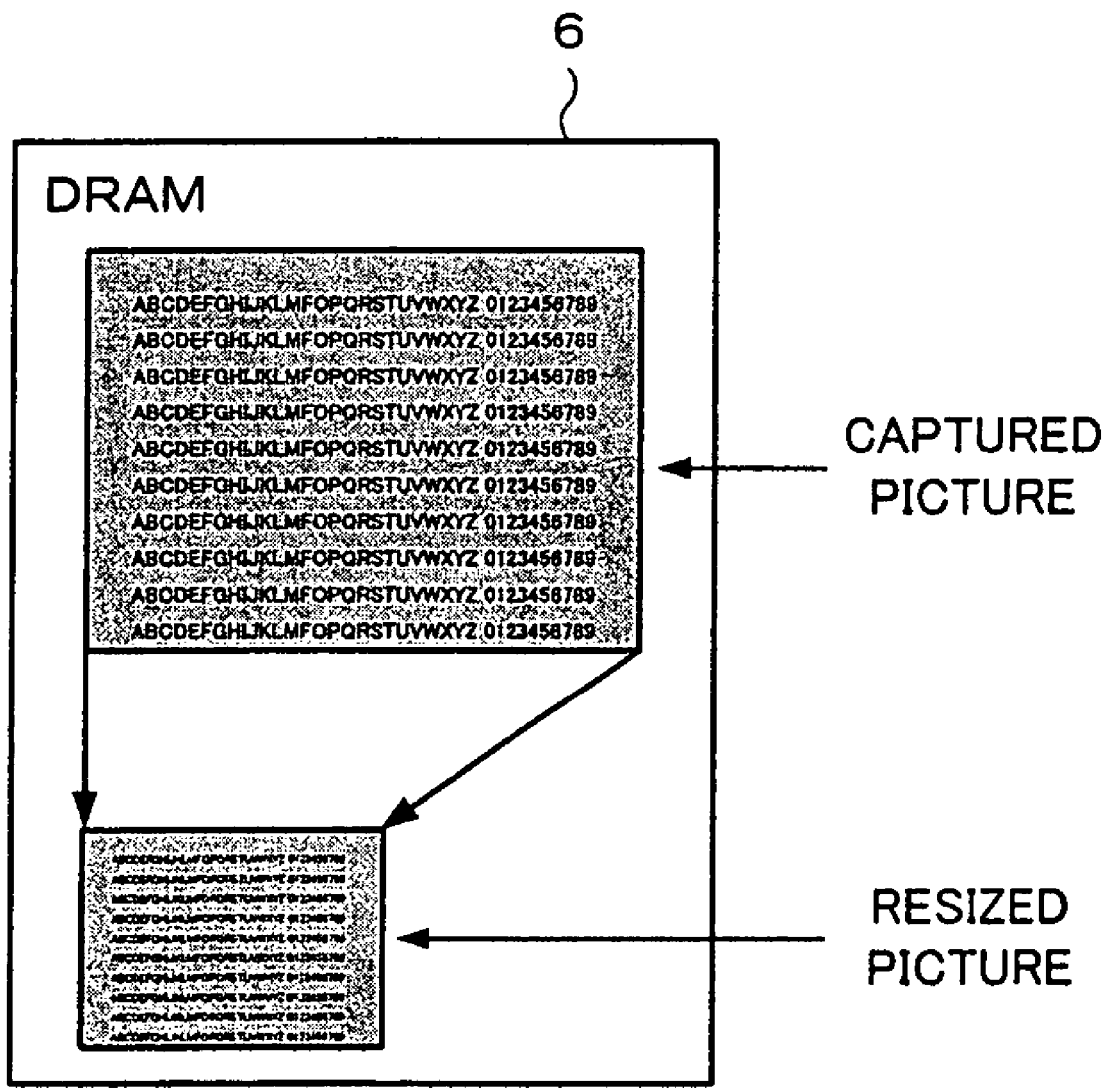
FIG. 15 is a schematic diagram showing the state that a resized picture is stored to a DRAM according to the embodiment of the present invention.

FIG. 15 shows the state of which a captured picture and a resized picture are stored in the DRAM 6. In the resizing process, the resolution converting portion 10 converts the size of the captured picture to the size of a VGA picture. In the example, when the size of the recorded picture is VGA, it is not necessary to perform the resizing process.

At step S23, an optimum threshold value is obtained corresponding to the color picture data of the resized picture. Since the distribution of color information of the original picture is the same as that of the resized picture, the same threshold value can be obtained regardless of the size of the picture. After a captured picture is resized to a predetermined size, a threshold value is obtained. Thus, regardless of the size of the selected record picture, the same algorithm can be always used. The process time necessary for obtaining a threshold value becomes constant. In addition, since a resized picture is stored in another area different from an area of a captured picture of the DRAM 6, the captured picture is not destroyed. Thus, after the threshold value is obtained, the same algorithm that uses data of all pixels can be used.

Next, another embodiment (as a second embodiment) of the present invention will be described. According to the above-described embodiment (as a first embodiment), the size of a captured picture is resized to a predetermined size. On the other hand, according to the second embodiment, a thin-out process is used for a picture. In the thin-out process, pixels are thinned out in such a manner that the distribution of color information does not vary. For example, lines are thinned out at predetermined intervals.

When a threshold value for digitizing a captured picture is obtained, it is important to obtain the distribution of color information of the captured picture. In other words, it is not necessary to fully consider data of all pixels. Even if lines are properly thinned out, a threshold value can be correctly obtained with a histogram. Thus, the process can be quickly performed. In addition, when the number of lines to be thinned out is varied depending on an object, a threshold value can be correctly obtained with the minimum amount of data.

Next, another embodiment (as a third embodiment) of the present invention will be described. According to the third embodiment, a window is designated in a photographed picture. With only information inside the window, a threshold value is obtained. In the process, noise of a peripheral portion of the picture and a peripheral unnecessary picture other than characters and a background thereof can be removed. Thus, a threshold value can be correctly obtained.

In other words, when a peripheral portion of a picture deteriorates and noise takes place due to an abnormality of the camera signal process, if information containing the noise is used for obtaining a threshold value, it cannot be correctly obtained. In addition, when a white board or a distant character manuscript is photographed, an unnecessary substance other than the white board and the character manuscript is contained in the photographed picture. Thus, a threshold value cannot be correctly obtained.

Figure 16A:
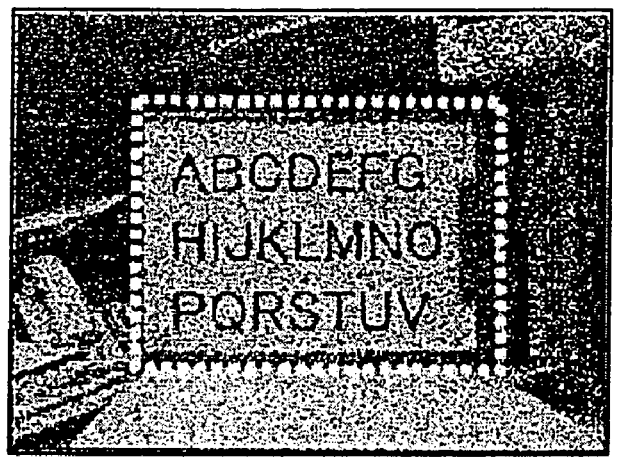
FIGS. 16A to 16C are schematic diagrams for explaining another embodiment of the present invention.
Figure 16B:
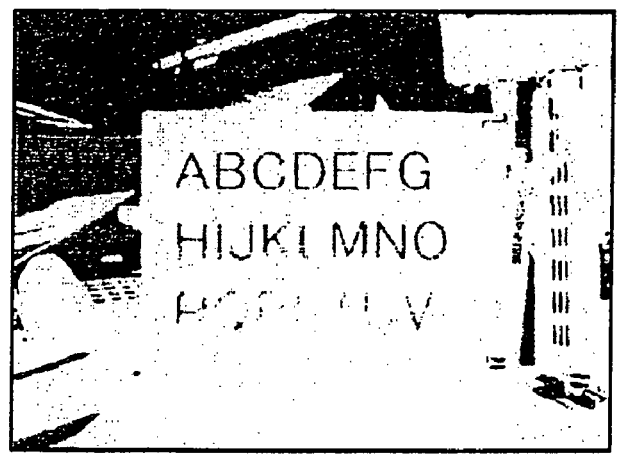
Figure 16C:
Figures 18A, 18B:
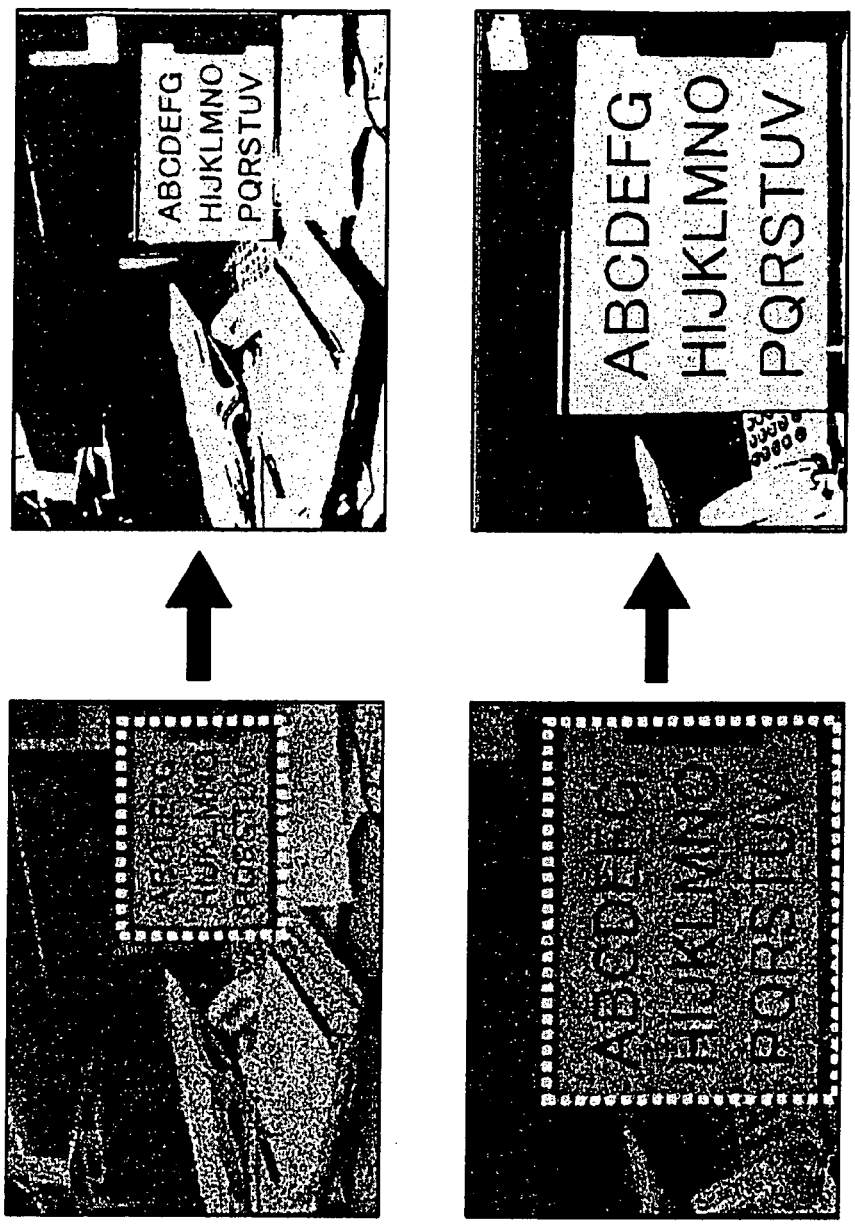
FIGS. 18A and 18B are schematic diagrams for explaining another embodiment of the present invention.

FIG. 16A shows an example of a picture of which a white board is photographed. In FIG. 16A, an unnecessary substance other than a white board is also photographed. When all data of the photographed picture is used, a threshold value cannot be correctly obtained. As a result, as shown in FIG. 16B, characters of the digitized picture become unclear. According to the third embodiment, a window that is denoted by dotted lines and that surrounds a center portion of the picture is designated. With only the center portion inside the window, a threshold value is obtained. As a result, a threshold value can be correctly obtained without an influence of the peripheral picture. As shown in FIG. 16C, the digitized picture becomes clear. Thus, characters become legible.

The size of the window that designates information that is used to obtain a threshold value is a predetermined size of a center portion of a photographed picture. However, since there are many types of photographed pictures, it is preferred for the user to designate the position and size of the window corresponding to the object. FIGS. 17A, 17B, 18A, and 18B show an example of a process for designating a window (denoted by dotted lines) corresponding to the position and size of a white board describing characters, obtaining a threshold value corresponding to information inside the window, and digitizing the picture with the threshold value. In reality, a window denoted by dotted lines designating the position and size thereof is superimposed with a photographed picture. The position of a window can be moved by the arrow keys of the operation input portion 8. The size of a window can be adjusted by the picture zoom up key and the picture zoom down key. A window may be denoted by other than dotted lines. The position and size of a window may be varied in various manners. Since a partial picture for obtaining a threshold value corresponding to a desired object can be selected, a threshold value can be more accurately obtained.

In addition, in a combination of the above-described embodiments, the process time can be shortened and a threshold value can be more accurately obtained. For example, when the size of a captured picture is resized, lines may be thinned out. Alternatively, the partial picture selecting process using a window and the resizing process can be combined.

As described above, when a character manuscript is digitized by a digital picture recording apparatus or when a recorded picture is reproduced, since the size of the screen of the digital camera is not large, it is difficult to check fine characters. Thus, even if a picture can be recorded with a large number of pixels, since the display performance of the displaying device is restricted, it is inconvenience not to check the content of a recorded character manuscript.

To solve such a problem, according to another embodiment of the present invention, a function for enlarging and scrolling a picture reproduced from the record medium 9 is provided. In addition, an enlarged picture is recorded as another picture file to the record medium 9.

FIG. 19 explains the enlarging and scrolling function according to the embodiment of the present invention. Reference numeral 21 is a displaying system. The displaying system 21 is composed of a screen 22 of the displaying device 4, a zoom (enlargement) key 24, a scroll key 25, and a record key 26. Those keys are disposed on the operation input portion 8. The zoom key 24 is used to zoom up from equal size to 10 times size. For example, whenever the zoom key 24 is pressed, the enlargement ratio is varied from 1 time to 2 times, to 3 times, . . . , and to 10 times. The zoom key 24 also has a function for reducing the size of an enlarged picture. Alternatively, another key (not shown) may have a function for reducing the size of an enlarged picture. An enlarged picture is displayed on the entire screen 22.

The screen 22 displays an area that user wants to enlarge. In addition, the screen 22 superimposes a window 23 in the size corresponding to the enlargement ratio. The scroll key 25 moves the window 23 on the screen 22 in the vertical direction and the horizontal direction. The record key 26 is used to record an enlarged picture to the record medium 9.

Figure 19A:
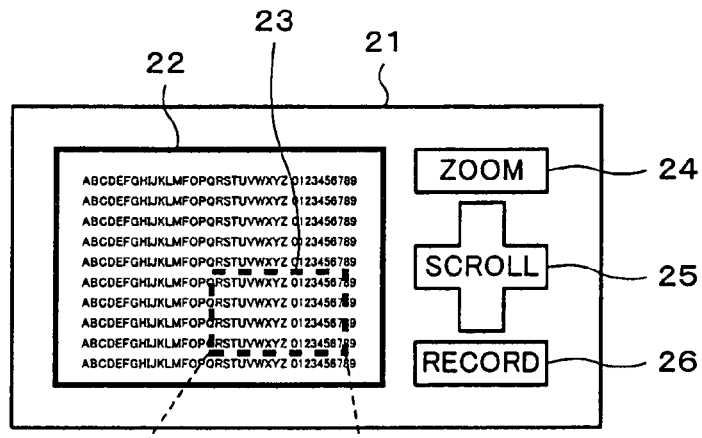
FIGS. 19A to 19C are schematic diagrams for explaining an enlarging process of a reproduced picture according to an embodiment of the present invention.
Figure 19B:
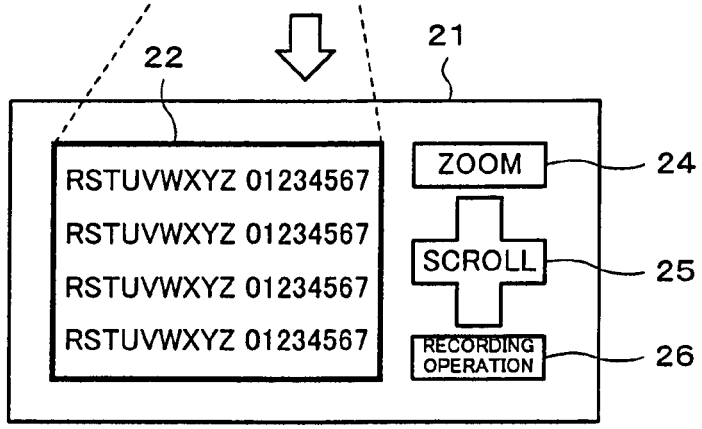

As shown in FIG. 19A, in the state that a picture reproduced from the record medium 9 is displayed on the screen 22, a zoom area is selected by moving the window 23. Then, as shown in FIG. 19B, an enlarged picture is displayed with a designated magnification ratio. Thus, a picture of a character manuscript can be displayed in the size in which the user can easily recognize the picture. As another operating method, an enlarged area may be fixed at a center portion of the screen 22. An enlarged picture may be displayed with a designated magnification ratio. Thereafter, with the scroll key 25, the enlarged picture may be scrolled.

Figure 19C:
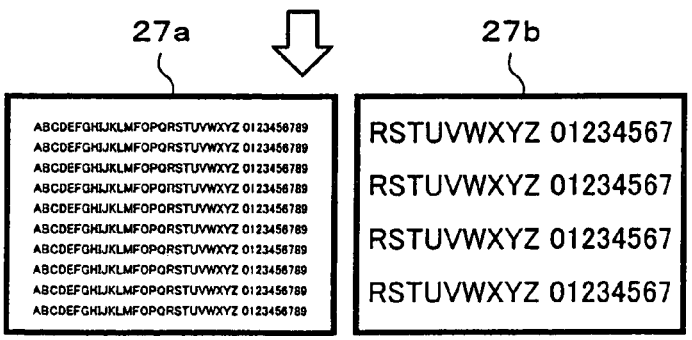

As shown in FIG. 19C, with a picture 27*a* reproduced from the record medium 9, an enlarged picture 27*b* can be obtained in the above-described operation. To save the enlarged picture 27*b*, the record key 26 is pressed. Thus, the enlarged picture 27*b* is converted into a GIF file and recorded to the record medium 9. The picture 27*a* and the enlarged picture 27*b* are recorded as different files. Thus, in a large character manuscript or the like, a desired portion can be enlarged. The enlarged picture can be recorded as another file.

The present invention can be applied to other digital picture recording apparatuses as well as a digital camera. For example, the present invention can be applied to the case that a digital picture recording apparatus for a moving picture has a still picture recording function. In addition, the present invention can be applied to the case that a portable personal computer having a CCD processes a photographed picture.

According to the present invention, a picture process can be performed corresponding to a captured picture. In other words, a natural picture is compressed corresponding to a non-inversible encoding method such as the JPEG method.

On the other hand, a character manuscript can be digitized and encoded corresponding to an inversible encoding method such as the LZE method. Thus, even if the photographing means is in common with those pictures, the size of data that has been compressed can be further reduced. In addition, a picture of which characters are clearly distinguished from a background thereof can be recorded and reproduced.

In addition, according to the present invention, a histogram of luminance data is created for each captured color picture. Corresponding to the histogram, a threshold value is obtained. Thus, a threshold value corresponding to a captured picture can be always obtained. In addition, since various parameters for obtaining a threshold value can be varied from the outside, a general-purpose algorithm can be provided without the dependency of the picture recording apparatus or the like to the system.

In addition, according to the present invention, a threshold value is obtained with a resized picture regardless of the size of a picture to be recorded, the algorithm for obtaining a threshold value can be used in common. Thus, the process time can be prevented from varying.

In addition, according to the present invention, since a threshold value is obtained with a thinned-out picture, a threshold value can be quickly obtained. By varying the thin-out process corresponding to an object, a threshold value can be obtained with a minimum amount of data.

In addition, according to the present invention, a threshold value is obtained with information of a part of a picture rather than data of the entire picture. Thus, a correct threshold value that allows a desired portion to be optimally digitized can be obtained without an influence of unnecessary information. In addition, the user can freely designate a desired portion of a picture. Thus, the user can freely select a portion for which he or she wants to digitize.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital picture processing apparatus for converting captured color picture information into a digitized picture, comprising:

means for creating a histogram that represents the distribution of the number of pixels of luminance data of color picture information; and means for detecting the maximum value and the minimum value of the histogram and deciding the intermediate value thereof as a threshold value, wherein the color picture is converted into a digitized picture with the threshold value of the intermediate value and wherein when the maximum value or the minimum value is obtained, a predetermined offset is assigned.

2. A digital picture processing apparatus for converting captured color picture information into a digitized picture, comprising:

means for creating a histogram that represents the distribution of the number of pixels of luminance data of color picture information; and means for detecting the maximum value and the minimum value of the histogram and deciding the intermediate value thereof as a threshold value, wherein the color picture is converted into a digitized picture with the threshold value of the intermediate value and wherein when the difference between the maximum value and the minimum value is less than a predetermined value, a fixed value instead of the intermediate value is designated as the threshold value.

3. A digital picture processing method for converting captured color picture information into a digitized picture, comprising the steps of:

(a) creating a histogram that represents the distribution of the number of pixels of luminance data of color picture information; and (b) detecting the maximum value and the minimum value of the histogram and deciding the intermediate value thereof as a threshold value, wherein the color picture is converted into a digitized picture with the threshold value of the intermediate value and wherein when the maximum value or the minimum value is obtained, a predetermined offset is assigned.

4. A digital picture recording apparatus for recording a picture as a digital signal to a record medium, comprising:

picture capturing means for capturing a color picture;

picture processing means for converting the captured color picture into a digitized picture corresponding to a threshold value; and recording means for recording an output signal of said picture processing means to the record medium, wherein said picture processing means creates a histogram that represents the distribution of the number of pixels of luminance data of the color picture, detects the maximum value and the minimum value of the histogram, and converts the color picture signal into a digitized picture with the threshold value that is the intermediate value of the maximum value and the minimum value.

5. The apparatus as set forth in claim 4, wherein when the maximum value or the minimum value is obtained, a predetermined offset is assigned.

6. The apparatus as set forth in claim 4, wherein when the difference between the maximum value and the minimum value is less than a predetermined value, a fixed value instead of the intermediate value is designated as the threshold value.

7. The apparatus as set forth in claim 4, wherein the intermediate value is adjustable.

8. A digital picture recording method for recording a picture as a digital signal to a record medium, comprising the steps of:

(a) capturing a color picture;

(b) converting the captured color picture into a digitized picture corresponding to a threshold value; and (c) recording an output signal that is output at the step (b) to the record medium, wherein the step (b) is performed by generating a histogram that represents the distribution of the number of pixels of luminance data of the color picture, detecting the maximum value and the minimum value of the histogram, and converting the color picture signal into a digitized picture with the threshold value that is the intermediate value of the maximum value and the minimum value.

9. A digital picture recording apparatus for recording a picture as a digital signal to a record medium, comprising:
  picture capturing means for capturing a color picture;
  picture processing means for converting the captured color picture into a digitized picture corresponding to a threshold value; and
  recording means for recording an output signal of said picture processing means to the record medium,
  wherein said picture processing means converts the captured color picture into a picture having a predetermined size or a predetermined number of pixels, decides a threshold value corresponding to the converted picture, and generates a digitized picture corresponding to the threshold value.

10. A digital picture recording apparatus for recording a picture as a digital signal to a record medium, comprising:
  picture capturing means for capturing a color picture;
  picture processing means for converting the captured color picture into a digitized picture corresponding to a threshold value; and
  recording means for recording an output signal of said picture processing means to the record medium,
  wherein said picture processing means thins out the captured color picture, generates a thinned picture, decides a threshold value corresponding to the thinned picture, and generates a digitized picture corresponding to the threshold value.

11. A digital picture recording apparatus for recording a picture as a digital signal to a record medium, comprising:
  picture capturing means for capturing a color picture;
  picture processing means for converting the captured color picture into a digitized picture corresponding to a threshold value; and
  recording means for recording an output signal of said picture processing means to the record medium,
  wherein said picture processing means decides a threshold value corresponding to a part including an object to be digitized selected from the captured color picture and generates a digitized picture corresponding to the threshold value.

12. The apparatus as set forth in claim 9,
  wherein the captured picture is capable to be converted into a recorded picture having a selected size or a selected number of pixels.

13. The apparatus as set forth in claim 9,
  wherein said picture processing means creates a histogram that represents the distribution of the number of pixels of luminance data of the converted picture, detects the maximum value and the minimum value of the histogram, and designates the intermediate value of the maximum value and the minimum value as the threshold value.

14. The apparatus as set forth in claim 10,
  wherein the thin-out process is performed by thinning out lines of the color picture.

15. The apparatus as set forth in claim 10,
  wherein the thin-out process can be varied corresponding to an object.

16. The apparatus as set forth in claim 11,
  wherein the part is displayed, and
  wherein the position and size of the part are changeable.

17. A digital picture recording method for recording a picture as a digital signal to a record medium, comprising the steps of:
  (a) converting a captured color picture into a digitized picture corresponding to a threshold value;
  (b) recording the digitized picture to the record medium;
  (c) converting the captured color picture into a picture having a predetermined size or a predetermined number of pixels;
  (d) deciding a threshold value corresponding to the converted picture; and
  (e) generating a digitized picture corresponding to the threshold value.

18. A digital picture recording method for recording a picture as a digital signal to a record medium, comprising the steps of:
  (a) converting a captured color picture into a digitized picture corresponding to a threshold value;
  (b) recording the digitized picture to the record medium;
  (c) thinning out the captured color picture so as to generate a thinned picture;
  (d) deciding a threshold value corresponding to the thinned picture; and
  (e) generating a digitized picture corresponding to the threshold value.

19. A digital picture recording method for recording a picture as a digital signal to a record medium, comprising the steps of:
  (a) converting a captured color picture into a digitized picture corresponding to a threshold value;
  (b) recording the digitized picture to the record medium;
  (c) deciding a threshold value corresponding to a part including an object to be digitized selected from the captured color picture; and
  (d) generating a digitized picture corresponding to the threshold value.

20. A digital picture transmitting method for transmitting a picture as a digital signal to a communication medium, comprising the steps of:
  (a) converting a captured color picture into a digitized picture corresponding to a threshold value;
  (b) transmitting the digitized picture to the communication medium;
  (c) converting the captured color picture into a picture having a predetermined size or a predetermined number of pixels;
  (d) deciding a threshold value corresponding to the converted picture; and
  (e) generating a digitized picture corresponding to the threshold value.

21. A digital picture transmitting method for transmitting a picture as a digital signal to a communication medium, comprising the steps of:
  (a) converting a captured color picture into a digitized picture corresponding to a threshold value;
  (b) transmitting the digitized picture to the communication medium;
  (c) thinning out the captured color picture so as to generate a thinned picture;
  (d) deciding a threshold value corresponding to the thinned picture; and
  (e) generating a digitized picture corresponding to the threshold value.

22. A digital picture transmitting method for transmitting a picture as a digital signal to a communication medium, comprising the steps of:
  (a) converting a captured color picture into a digitized picture corresponding to a threshold value;
  (b) transmitting the digitized picture to the communication medium;
  (c) deciding a threshold value corresponding to a part including an object to be digitized selected from the captured color picture; and (d) generating a digitized picture corresponding to the threshold value.

23. The apparatus as set fort in claim 10, wherein the captured picture is capable to be converted into a recorded picture having a selected size or a selected number of pixels.

24. The apparatus as set forth in claim 11, wherein the captured picture is capable to be converted into a recorded picture having a selected size or a selected number of pixels.

25. The apparatus as set forth in claim 10, wherein said picture processing means creates a histogram that represents the distribution of the number of pixels of luminance data of the converted picture, detects the maximum value and the minimum value of the histogram, and designates the intermediate value of the maximum value and the minimum value as the threshold value.

26. The apparatus as set forth in claim 11, wherein said picture processing means creates a histogram that represents the distribution of the number of pixels of luminance data of the converted picture, detects the maximum value and the minimum value of the histogram, and designates the intermediate value of the maximum value and the minimum value as the threshold value.

* * * * *